July 21, 1970
G. J. ADAMS ET AL
3,521,316
AIRPLANE LOADING RAMP STRUCTURE SUPPLYING
UTILITIES TO THE AIRPLANE
Filed Nov. 5, 1968
3 Sheets-Sheet 1
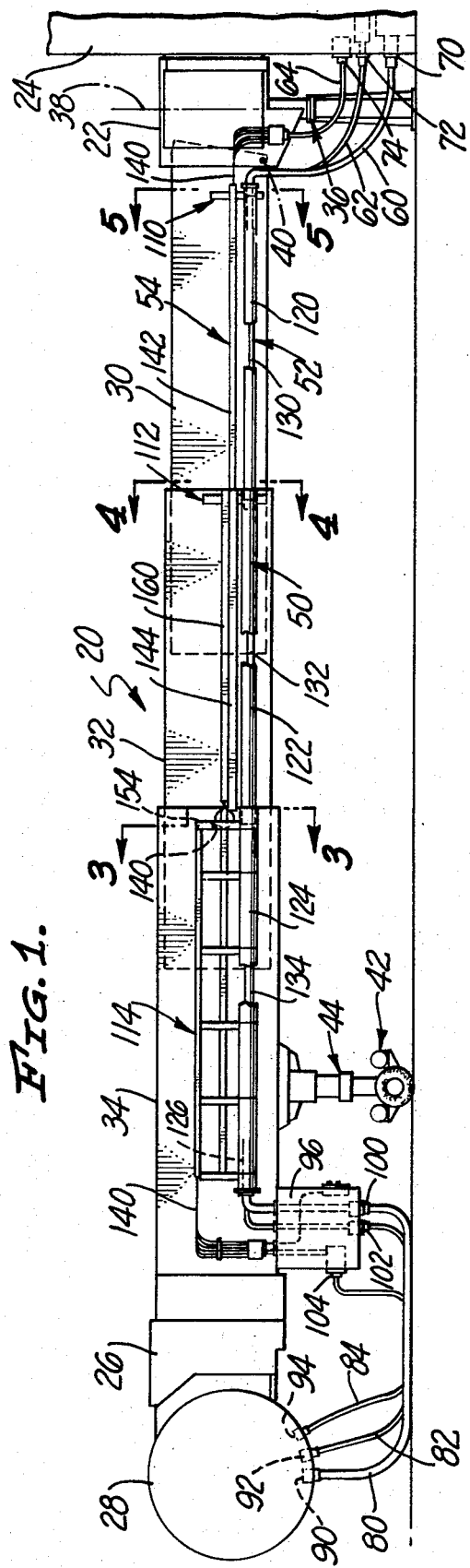
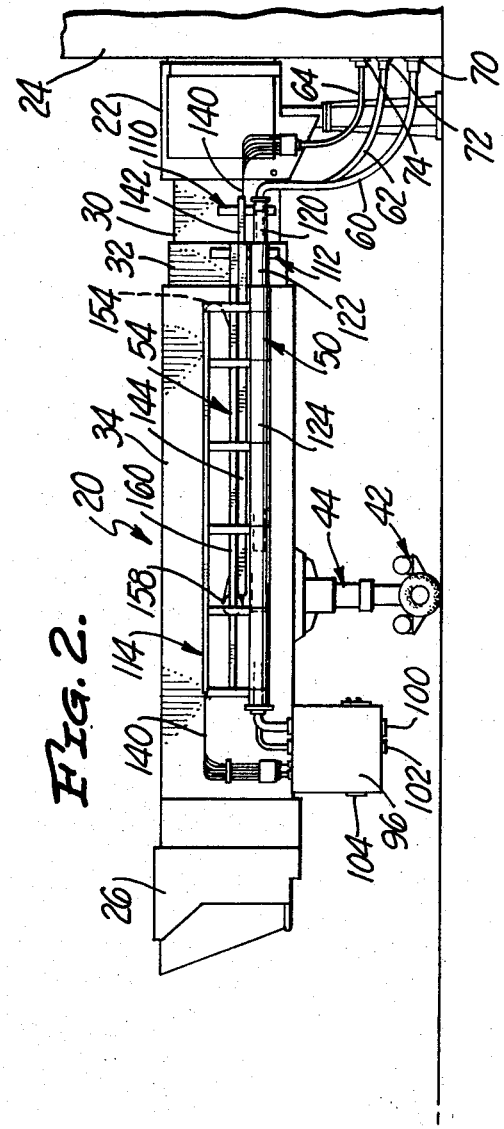
INVENTORS
GEORGE J. ADAMS,
HANS F. KJERULF
BY THEIR ATTORNEYS
HARRIS, KIECH, RUSSELL & KERN

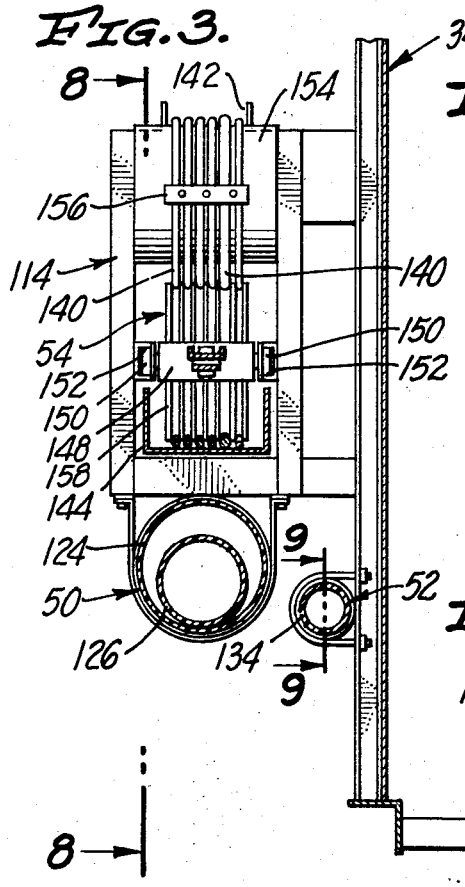
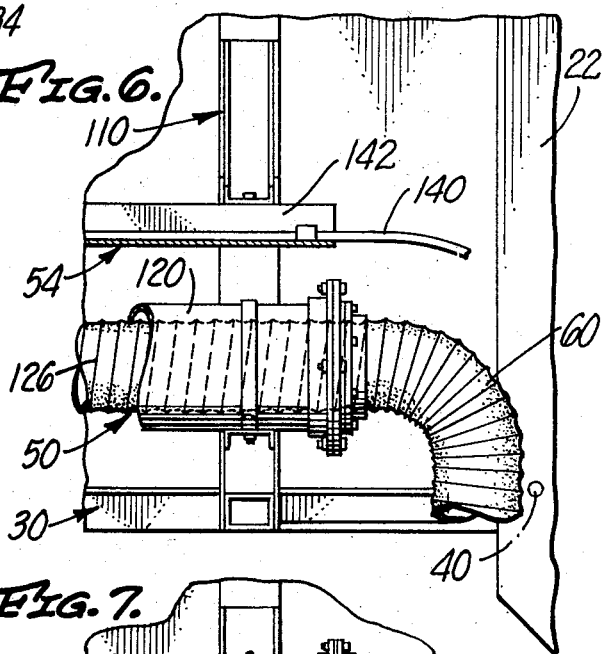
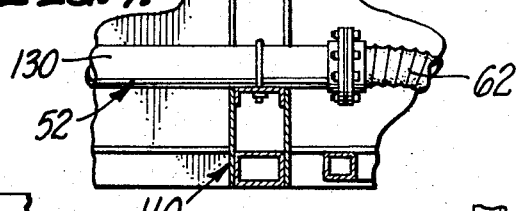
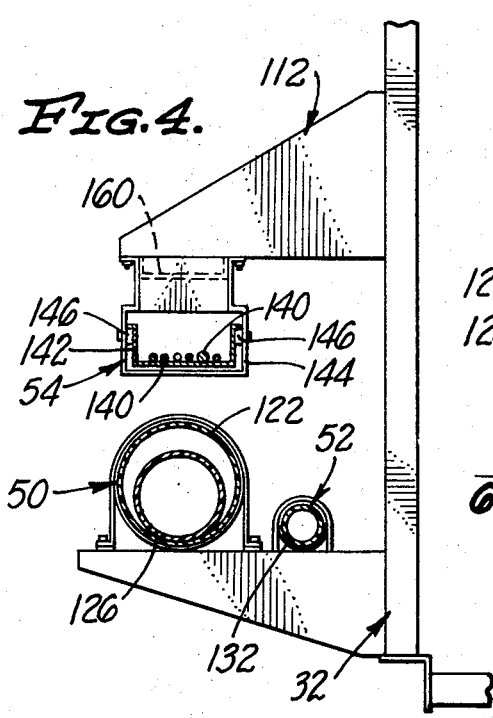
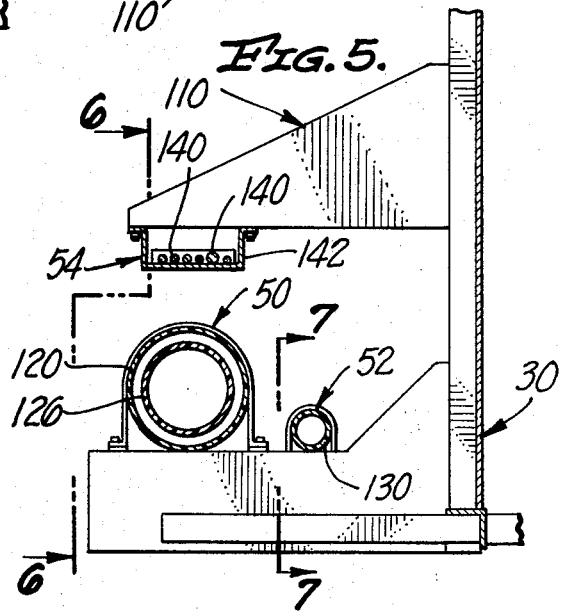

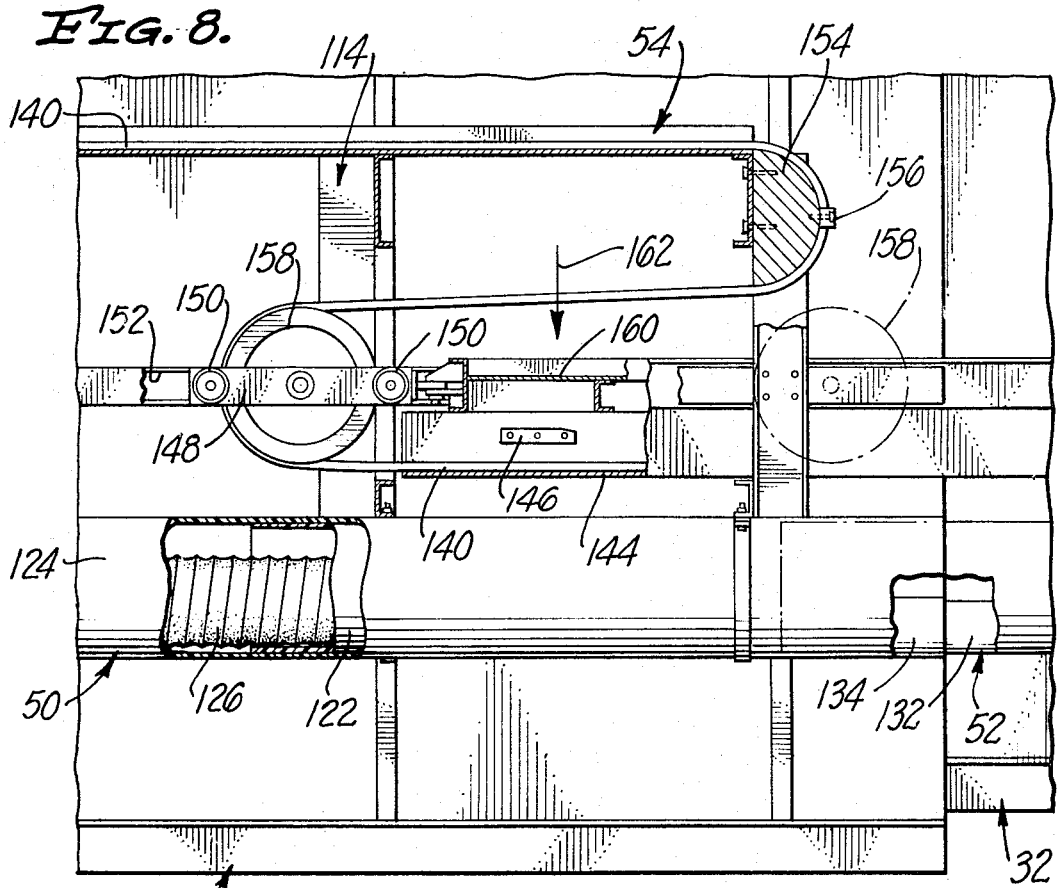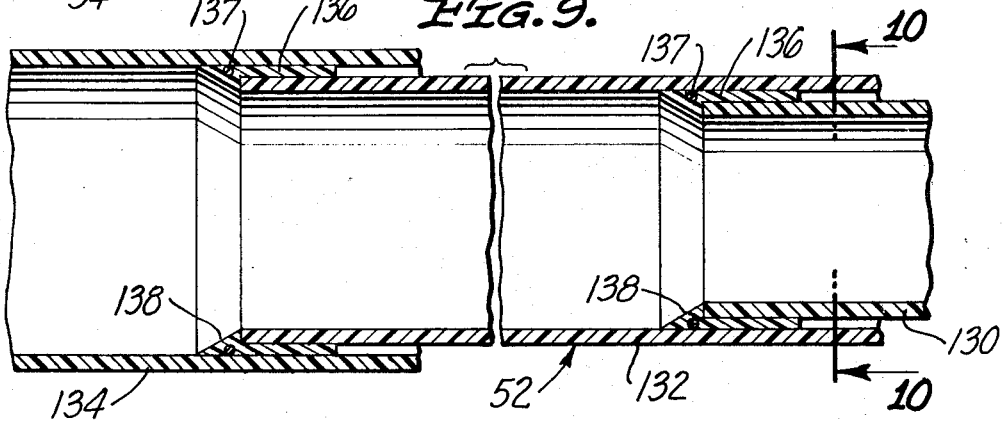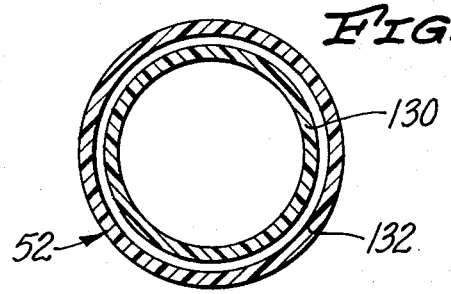

United States Patent Office 3,521,316
Patented July 21, 1970

3,521,316
AIRPLANE LOADING RAMP STRUCTURE SUPPLYING UTILITIES TO THE AIRPLANE
George J. Adams, Santa Monica, and Hans F. Kjerulf, Los Angeles, Calif., assignors to Stanray Corporation, Chicago, Ill., a corporation of Delaware
Filed Nov. 5, 1968, Ser. No. 773,473
Int. Cl. B65g 11/00
U.S. Cl. 14—71                                    11 Claims

ABSTRACT OF THE DISCLOSURE

An apparatus for transferring passengers between a terminal and an airplane and for supplying utilities to the airplane, including a telescoping passenger loading and unloading ramp having an inner end adjacent and communicating with the terminal and having an outer end engageable with the airplane around a doorway therein, and further including utility supply systems which are carried by the telescoping ramp and which are extensible and contractible with the telescoping ramp as it is extended and contracted in moving the outer end thereof toward and away from the airplane. The inner ends of the utility supply systems are connected to suitable utility sources at the terminal, such as a source of temperature and humidity conditioned air for delivery to the cabin of the airplane, a source of compressed air for engine starting, a source of electrical power, and the like. The apparatus includes means for respectively connecting the outer ends of the various utility supply systems to corresponding utility inlets on the airplane.

BACKGROUND OF INVENTION

The invention relates in general to loading passengers on and unloading them from airplanes and to supplying the airplanes with various utilities while they are being loaded and unloaded.

A passenger airplane is conventionally provided with various utilities while it is being readied for its next flight. For example, it is desirable to supply temperature and humidity conditioned air to the sections of the cabin occupied by the passengers and crew while the airplane is on the ground between flights. Also, it is conventional to provide the airplane with compressed air for starting the engines thereof when it is ready for flight, and to provide electrical power for various equipment on the airplane until such time as the engines are started and the airplane's own generating equipment takes over.

At the present time, there is no correlation between the loading and unloading of passengers and the supplying of utilities to the airplane. In other words, each is currently treated as a separate problem independent of the other.

SUMMARY AND OBJECTS OF INVENTION

With the foregoing as background, the primary object of the present invention is to correlate the supplying of utilities to passenger airplanes and the loading and unloading of passengers by providing an apparatus which includes facilities for performing both functions concurrently.

More particularly, an important object of the invention is to provide an apparatus for transferring passengers between a terminal and an airplane, and for supplying utilities to the airplane, which includes: a telescoping passenger loading and unloading ramp having an inner end adjacent and communicating with the terminal and having an outer end engageable with the airplane around a doorway therein; and supply systems for delivering utilities to the airplane which are carried by the telescoping ramp and which are capable of extending and contracting concurrently with the ramp as it is extended and contracted to move the outer end thereof toward and away from the airplane.

Related objects are to connect the inner ends of the utility supply systems to utility sources at the terminal, and to provide means for respectively connecting the outer ends of the utility supply systems to corresponding utility inlets on the airplane.

Still more specifically, the invention contemplates an apparatus of the foregoing nature wherein the telescoping ramp is of the type which is horizontally swingable and vertically pivotable as the outer end thereof is brought into engagement with the airplane around the doorway therein, and which includes inner, intermediate and outer ramp sections progressively increasing in cross sectional dimensions from the inner end of the ramp to the outer end thereof so that the intermediate ramp section is telescoped over the inner ramp section and the outer ramp section is telescoped over the intermediate ramp section.

An important object of the invention is to provide utility supply systems, for use with a telescoping ramp of the foregoing type, each including a telescoping structure having an outer section connected to the outer ramp section, an intermediate section connected to the intermediate ramp section adjacent the inner end thereof only, and an inner section connected to the inner ramp section adjacent the inner end thereof only.

A further object is to provide an apparatus of the foregoing nature wherein at least one of the telescoping structures mentioned comprises a telescoping duct.

Still another object is to provide in such a telescoping duct an extensible and contractible, flexible conduit having inner and outer ends respectively connectible to a conditioned air source at the terminal and a conditioned air inlet on the airplane. With this construction, the flexible conduit extends and contracts as the telescoping duct containing it is extended and contracted in response to extension and contraction of the telescoping passenger ramp in moving the outer end thereof toward and away from the airplane. An important feature of the invention is that the use of such a conduit in a telescoping duct provides around the conduit a dead air space for heat insulating purposes.

Other important objects of the invention are to provide a utility supply system of the foregoing nature which includes electrical cables, means for taking up slack in the cables as the telescoping passenger ramp is contracted, and means on the intermediate section of the telescoping structure forming part of the electrical supply system for supporting portions of the electrical cables as slack in the cables is taken up by the slack take-up means in response to contraction of the telescoping passenger ramp.

Another object of the invention is to provide means on the telescoping passenger ramp adjacent the outer end thereof for storing the portions of the utility supply systems which are connectible to the utility inlets on the airplane, when such portions are not in use.

The foregoing objects, advantages, features and results of the present invention, together with various other objects, advantages, features and results thereof which will be evident to those skilled in the air transport art in the light of this disclosure, may be achieved with the exemplary embodiment of the invention illustrated in the accompanying drawings and described in detail hereinafter.

DESCRIPTION OF DRAWINGS

In the drawings:
FIG. 1 is a side elevational view of the apparatus of the invention in its extended condition to provide passenger and utility service from a terminal to an airplane;

FIG. 2 is a side elevational view showing the apparatus in its contracted condition;

FIGS. 3, 4 and 5 are enlarged, fragmentary transverse sectional views respectively taken along the arrowed lines 3—3, 4—4 and 5—5 of FIG. 1;

FIGS. 6 and 7 are sectional views respectively taken along the arrowed lines 6—6 and 7—7 of FIG. 5;

FIG. 8 is a sectional view taken as indicated by the arrowed line 8—8 of FIG. 3;

FIG. 9 is an enlarged, fragmentary sectional view taken substantially as indicated by the arrowed line 9—9 of FIG. 3; and FIG. 10 is a transverse sectional view taken as indicated by the arrowed lines 10—10 of FIG. 9 of the drawings.

DESCRIPTION OF EXEMPLARY EMBODIMENT OF INVENTION

Referring initially to FIGS. 1 and 2 of the drawings, the invention includes a telescoping passenger loading and unloading ramp 20 having an inner end 22 adjacent and communicating with a terminal 24, which may be part of an airport terminal building, and having an outer end 26 engageable with the fuselage of an airplane 28 around a doorway, not shown, therein.

The telescoping ramp 20 includes as its basic components inner, intermediate and outer ramp sections 30, 32 and 34 progressively increasing in cross sectional dimensions from the inner end 22 of the ramp to the outer end 26 thereof so that the intermediate ramp section 32 is telescoped over the inner ramp section 30 and the outer ramp section 34 is telescoped over the intermediate ramp section 32. The outer end 26 of the telescoping ramp 20 is carried by the outer ramp section 34.

The telescoping ramp 20 includes supporting means 36 for the inner end 22 of the ramp which provides for horizontal swinging movement of the telescoping ramp sections 30, 32 and 34 about a vertical pivot axis 38, FIG. 1. Additionally, the inner ramp section 30 is pivotable vertically relative to the inner end 22 of the telescoping ramp 20 about a transverse horizontal pivot axis 40 to permit raising and lowering the outer end 26 of the telescoping ramp.

The outer ramp section 34 is supported intermediate its ends by a wheeled, steerable, self-propelled truck 42 which includes vertically extensible and contractible means 44 for pivoting the telescoping ramp sections vertically about the transverse horizontal pivot axis 40 to raise and lower the outer end 26 of the telescoping ramp 20.

By properly correlating the operation of the steerable self-propelled truck 42 and the vertically extensible and contractible means 44, the telescoping ramp 20 may be swung horizontally about the vertical axis 38 and pivoted vertically about the horizontal axis 40 as required to maneuver the outer end 26 of the ramp into engagement with the airplane 28 around the desired doorway therein.

A telescoping ramp of the foregoing general type is disclosed in more detail in Pat. No. 3,184,772, issued May 25, 1965, in the names of Herbert Carvel Moore and Carl L. Lodjic. Reference may be had to this patent for a more detailed disclosure if desired.

The present invention includes, in combination with the telescoping passenger loading and unloading ramp 20, utility supply systems 50, 52 and 54 which are carried by the telescoping ramp and which are extensible and contractible with the telescoping ramp as it is extended and contracted in moving the outer end thereof toward and away from the airplane 28.

The respective utility supply systems 50, 52 and 54 are provided at their inner ends with flexible sections 60, 62 and 64 respectively connected to corresponding utility sources 70, 72 and 74 at the terminal 24.

The supply systems 50, 52 and 54 respectively include at their outer ends flexible outer sections 80, 82 and 84 connectible to corresponding utility inlets 90, 92 and 94 on the airplane 28, preferably by means of suitable quick-connect and quick-disconnect fittings which are not specifically shown. Preferably, the outer ramp section 34 is provided therebeneath with a storage compartment 96 in which the flexible outer sections 80, 82 and 84 of the utility supply systems 50, 52 and 54 may be stowed while the telescoping ramp is being extended, contracted, or otherwise maneuvered, and while it is not in use. To permit stowing the flexible outer sections 80, 82 and 84 in the storage compartment 96, they are preferably quickly connectible to and disconnectible from the sections of the utility supply systems 50, 52 and 54 which are carried by the outer ramp section 34. For this purpose, suitable quick-connect and quick-disconnect fittings 100, 102 and 104 may be provided.

The extensible and contractible utility supply systems 50, 52 and 54 carried by the telescoping passenger loading and unloading ramp 20 in accordance with the invention may furnish various utilities to the airplane 28. For example, the supply system 50 may furnish temperature and humidity conditioned air to the sections of the airplane 28 occupied by the passengers and the crew while the airplane is on the ground before and after a flight. The supply system 52 may furnish compressed air to the airplane 28 for the purpose of starting the engines thereof when it is ready for flight. Similarly, the supply system 54 may furnish electrical power for various equipment on the airplane until such time as the engines are started and the generating equipment with which the airplane is equipped takes over. For convenience, therefore, the utility supply systems 50, 52 and 54 will be regarded hereinafter as furnishing conditioned air, compressed air and electrical power, respectively.

The telescoping ramp 20 is shown as provided on one side thereof with inner, intermediate and outer utility-system supporting structures 110, 112 and 114 respectively mounted on the inner, intermediate and outer ramp sections 30, 32 and 34. To permit telescoping of the intermediate ramp section 32 over the inner ramp section 30, the inner utility-system supporting structure 110 is located adjacent the inner end of the inner ramp section. Similarly, the intermediate utility-system supporting structure 112 is located adjacent the inner end of the intermediate ramp section 32. The outer utility-system supporting structure 114 has a length approaching that of the outer ramp section 34 and extends from the inner end of the outer ramp section to the storage compartment 96.

Each of the utility supply systems 50, 52 and 54 includes an extensible and contractible, telescoping structure, to be described in detail hereinafter, having inner, intermediate and outer sections respectively connected to the inner, intermediate and outer utility-system supporting structures 110, 112 and 114. These telescoping structures of the utility supply systems 50, 52 and 54 extend and contract concurrently with the telescoping ramp 20 itself as it is extended and contracted. The telescoping structures of the temperature and humidity conditioned air supply system 50, the compressed air supply system 52, and the electrical supply system 54 will now be considered in detail in that order.

Considering now the telescoping structure of the conditioned air supply system 50, it comprises telescopically interconnected inner, intermediate and outer tubular sections 120, 122 and 124 respectively mounted on the inner, intermediate and outer utility-system supporting structures 110, 112 and 114. The telescopically interconnected tubular sections 120, 122 and 124 of the conditioned air supply system 50, which sections may be formed of nylon, constitute a telescoping duct which contains an extensible and contractible, flexible conduit 126 of conventional construction which is connected at its inner end to the flexible inner section 60 and which is connectible at its outer end to the flexible outer section 80. Temperature and humidity conditioned air flows from the source 70 to the airplane 28 through the flexible inner section 60, the flexible conduit 126, the flexible outer section 80 and the conditioned air inlet 90.

As the telescoping ramp 20 is extended and contracted, the telescoping conduit formed by the telescopically interconnected tubular sections 120, 122 and 124 is correspondingly extended and contracted. At the same time, the extensible and contractible, flexible conduit 126 is correspondingly extended and contracted, which is an important feature. Preferably, the telescoping duct formed by the telescopically interconnected tubular sections 120, 122 and 124 is provided with an opening, not shown, at one end to prevent an air lock within such telescoping duct.

It will be noted from the drawings that the extensible and contractible, flexible conduit 126 has a maximum outside diameter somewhat less than the minimum inside diameter of the telescoping duct in which it is disposed. This results in a substantially dead air space around the conduit 126 when it is in use so as to minimize heat transfer between the interior of the conduit 126 and the atmosphere.

The telescoping structure of the compressed air supply system 552 comprises a telescoping duct formed of telescopically interconnected inner, intermediate and outer tubular sections 130, 132 and 134, respectively, mounted on the inner, intermediate and outer utility-system supporting structures 110, 112 and 114. As best shown in FIG. 9 of the drawings, the outer ends of the inner and intermediate tubular sections 130 and 132 terminate in collars 136 equipped with O-rings 137 and provided with beveled ends 138. With such constructions, the pressure of the compressed air within the tubular sections 130, 132 and 134 tends to expand the collars 136 to force the O-rings 137 into air-tight engagement with the tubular sections 134 and 132.

With the foregoing construction, compressed air can flow from the source 72 to the inlet 92 on the airplane 28 by way of the flexible inner section 62, the telescoping duct formed by the telescopically interconnected tubular sections 130, 132 and 134, and the flexible outer section 82. As will be apparent, the telescoping duct formed by the telescopically interconnected sections 130, 132 and 134 extends and contracts concurrently with the telescoping ramp 20 as the latter is extended and contracted.

Turning now to a consideration of the electrical supply system 54, it includes a plurality of electrical cables 140 in side-by-side relation, these cables extending from the source 74 to the electrical inlet 94 on the airplane when this system is in use. The cables 140 are of such a length as to be at least approximately straight in the region between the inner utility-system supporting structure 110 and the outer end of the outer utility-system supporting structure 114 when the telescoping ramp 20 is fully extended. As will be apparent, when the telescoping ramp 20 is contracted from its fully extended condition, the cables 140 tend to slacken. The electrical supply system 54 of the invention provides, as will be described in detail hereinafter, means for taking up slack in the cables 140 and means for supporting portions of the cables which tend to become slack as the slack therein is taken up by the slack take-up means. All of this is accomplished, as well become apparent, without winding excess cable length on a reel, or the like, which is impossible or undesirable because of the inductive effects which would result due to the high frequencies employed in contemporary electrical systems for aircraft.

As best shown in FIGS. 1, 4, 5 and 6 of the drawings, the sections of the cables 140 adjacent the inner ramp section 30 lie in side-by-side relation in an inner channel-shaped pan 142 which extends the length of the ramp section 30 and which is mounted on the inner utility-system supporting structure 110 on the ramp section 30. The inner channel-shaped pan 142 is telescoped at its outer end into an intermediate channel-shaped pan 144 which extends longitudinally of the intermediate ramp section 32 and the inner end of which is mounted on the intermediate utility-system supporting structure 112. As best shown in FIGS. 4 and 8, the intermediate channel-shaped pan 144 is provided on its side walls with glides 146 supporting longitudinal flanges on the inner channel-shaped pan 142. Thus, the intermediate pan 144 supports the outer end of the inner pan 142. The outer end of the intermediate pan 144 is supported by a frame 148, FIGS. 3 and 8, carrying wheels 150 movable in tracks 152 extending longitudinally of and carried by the outer utility-system supporting structure 114 on the outer ramp section 34.

With the foregoing construction, when the telescoping ramp 20 is fully extended, inner and intermediate sections of the cables 140 lie in the inner and intermediate pans 142 and 144, respectively, in side-by-side relation, as shown in FIGS. 3, 4, 5, 6 and 8 of the drawings. When the telescoping ramp 20 is contracted, the outer end of the inner pan 142 slides along the intermediate pan 144. At the same time, the cables 140 tend to slacken, and the taking up of this slack is the function of a slack take-up means which is best shown in FIGS. 3 and 8 of the drawings and which will now be described.

Referring to FIGS. 3 and 8, the cables 140 pass around a grooved cable support 154 which has an angular extent of approximately 180° and which is rigidly mounted on the outer utility-system supporting structure 114 on the outer ramp section 34 adjacent the inner end of the latter. The cables 140 are suitably secured to the cable support 154, as by a cable clamp 156.

Between the cable support 154 and the intermediate pan 144, the cables 140 pass around a grooved cable pulley 158 on the wheeled frame 148. Above the intermediate channel-shaped pan 144, and rigidly connected thereto, is another channel-shaped, cable-supporting, longitudinally-extending pan 160 which supports cable sections delivered thereto by the cable guide 154 and the cable pulley 158 as the telescoping ramp 20 is contracted, these elements constituting a slack take-up means of the invention and a means thereof for supporting the cable sections taken up by the slack take-up means.

Considering the over-all operation of the electrical supply system 54, it will be assumed that the telescoping ramp 20 is fully extended initially. As the telescoping ramp 20 is contracted from its fully extended position, the fixed cable support 154 moves to the right relative to the cable pulley 158, as viewed in FIG. 8 (and also as viewed in FIGS. 1 and 2), to remove portions of the cables 140 from the outer end of the intermediate pan 144. Such portions pass upwardly around the cable pulley 158 and are deposited in the upper channel-shaped cable-supporting pan 160 above the intermediate pan 144, as suggested by the arrow 162 in FIG. 8 of the drawings, and as shown in FIG. 2 thereof. Thus, as the telescoping ramp 20 is contracted, the slack in the cables 140 which would otherwise result is taken up by the cable support 154 and the pulley 158, and is deposited in the upper cable-supporting pan 160.

Upon subsequent extension of the telescoping ramp 20 the foregoing sequence of operations is reversed until, when the telescoping ramp 20 is fully extended, the cables 140 are routed as illustrated generally in FIG. 1 of the drawings.

Although an exemplary embodiment of the invention has been disclosed herein for purposes of illustration, it will be understood that various changes, modifications and substitutions may be incorporated in such embodiment without departing from the spirit of the invention.

We claim as our invention:

1. In an apparatus for transferring passengers between a terminal and an airplane and for supplying utilities to the airplane, the combination of:
   (a) a telescoping passenger loading and unloading ramp having an inner end adjacent and communicating with the terminal and having an outer end engageable with the airplane around a doorway therein;

(b) extensible and contractible utility supply systems carried by said ramp and each having inner and outer ends respectively adjacent said inner and outer ends of said ramp;

(c) means for respectively connecting said inner ends of said utility supply systems to utility sources at the terminal; and (d) means for respectively connecting said outer ends of said utility supply systems to utility inlets on the airplane.

2. An apparatus as set forth in claim 1 wherein each of said utility supply systems includes a telescoping structure.

3. An apparatus as defined in claim 2 wherein at least one of said telescoping structures comprises a telescoping duct.

4. An apparatus according to claim 3 including an extensible and contractible, flexible conduit in said telescoping duct and respectively connectible at its ends to a conditioned air source at the terminal and a conditioned air inlet on the airplane.

5. An apparatus as set forth in claim 1 wherein one of said utility supply systems includes electrical lines and means for taking up slack in said electrical lines as said ramp is contracted.

6. In an apparatus for transferring passengers between a terminal and an airplane and for supplying utilities to the airplane, the combination of:

(a) a telescoping passenger loading and unloading ramp having an inner end adjacent and communicating with the terminal and having an outer end engageable with the airplane around a doorway therein;

(b) said ramp including inner, intermediate and outer ramp sections progressively increasing in cross sectional dimensions from said inner end of said ramp to said outer end thereof so that said intermediate ramp section is telescoped over said inner ramp section and said outer ramp section is telescoped over said intermediate ramp section;

(c) extensible and contractible utility supply systems mounted on said ramp sections and each having inner and outer ends respectively adjacent said inner and outer ends of said ramp;

(d) means for respectively connecting said inner ends of said utility supply systems to utility sources at the terminal; and (e) means for respectively connecting said outer ends of said utility supply systems to utility inlets on the airplane.

7. An apparatus as defined in claim 6 wherein each of said utility supply systems includes a telescoping structure having an outer section connected to said outer ramp section, an intermediate section connected to said intermediate ramp section adjacent the inner end thereof, and an inner section connected to said inner ramp section adjacent the inner end thereof.

8. An apparatus according to claim 7 wherein one of said telescoping structures comprises a telescoping duct.

9. An apparatus as set forth in claim 8 including an extensible and contractible, flexible conduit in said duct and having inner and outer ends respectively connectible to a conditioned air source at said terminal and a conditioned air inlet on the airplane.

10. An apparatus according to claim 7 wherein one of said utility supply systems includes electrical cables and means for taking up slack in said cables as said ramp is contracted.

11. An apparatus according to claim 10 wherein said intermediate section of said telescoping structure of said one utility supply system includes means for supporting portions of said electrical cables as slack in said cables is taken up by said slack take-up means in response to contraction of said ramp.

References Cited

UNITED STATES PATENTS

| 3,184,772 | 5/1965 | Moore et al. | 14—71 |
| 3,228,051 | 1/1966 | Voase | 14—71 |

JACOB L. NACKENOFF, Primary Examiner